US012420544B2

(12) United States Patent
Keilhau

(10) Patent No.: US 12,420,544 B2
(45) Date of Patent: Sep. 23, 2025

(54) FOLDING APPARATUS OF AN OFFSET WEB-FED PRINTING PRESS AND OFFSET WEB-FED PRINTING PRESS

(71) Applicant: manroland Goss web systems GmbH, Augsburg (DE)

(72) Inventor: Theo Keilhau, Neusäß (DE)

(73) Assignee: manroland Goss web systems GmbH, Augsburg (DE)

( * ) Notice: Subject to any disclaimer, the term of this patent is extended or adjusted under 35 U.S.C. 154(b) by 343 days.

(21) Appl. No.: 18/144,944

(22) Filed: May 9, 2023

(65) Prior Publication Data

US 2023/0364903 A1 Nov. 16, 2023

(30) Foreign Application Priority Data

May 10, 2022 (DE) ..................... 10 2022 111 571.2

(51) Int. Cl.
*B65H 45/28* (2006.01)
*B41F 1/16* (2006.01)
(Continued)

(52) U.S. Cl.
CPC ................ *B41F 17/02* (2013.01); *B41F 1/16* (2013.01); *B41F 1/28* (2013.01); *B65H 45/22* (2013.01);
(Continued)

(58) Field of Classification Search
None
See application file for complete search history.

(56) References Cited

U.S. PATENT DOCUMENTS 5,405,126 A 4/1995 Mack
2007/0018373 A1* 1/2007 Shoji ..................... B65H 45/28 270/4

(Continued)

FOREIGN PATENT DOCUMENTS

DE 102012103729 A1 10/2013
EP 0873273 B1 12/2000

(Continued)

OTHER PUBLICATIONS

Deutsches Patent-Und Markenamt [German Patent and Trademark Office], Recherchenbericht [Search Report], Jan. 3, 2023 [Jan. 3, 2023], 8 Pages, Munchen, Germany (DE).

(Continued)

*Primary Examiner* — Leslie J Evanisko
(74) *Attorney, Agent, or Firm* — NK Patent Law

(57) ABSTRACT

A folding apparatus of an offset web-fed printing press includes a first transport means formed as belt conveyor system for a web-shaped printing material and configured such that belts thereof can be driven at a speed, which corresponds to the speed of the printing material, and a first cutting means arranged in the region of the first transport means configured such that it severs the printing material in a format-variable manner in those sections not covered by the belts of the first transport means, and a second transport means arranged downstream from the first transport means and formed as belt conveyor system, the belts of which are offset relative to the belts of the first transport means transversely to the transport direction of the printing material, configured such that the belts thereof can be driven at a speed larger than the speed of the belts of the first transport means.

15 Claims, 4 Drawing Sheets

(51) Int. Cl.

| | |
|---|---|
| ***B41F 1/28*** | (2006.01) |
| ***B41F 13/56*** | (2006.01) |
| ***B41F 13/64*** | (2006.01) |
| ***B41F 17/02*** | (2006.01) |
| ***B65H 45/22*** | (2006.01) |
| *B65H 29/14* | (2006.01) |

(52) U.S. Cl.

CPC ............. *B65H 45/28* (2013.01); *B65H 29/14* (2013.01); *B65H 2513/10* (2013.01)

(56) References Cited

U.S. PATENT DOCUMENTS

| | | | | |
|---|---|---|---|---|
| 2009/0038454 | A1 | 2/2009 | St. Ours et al. | |
| 2013/0047875 | A1* | 2/2013 | Ebert ..................... | B65H 45/28 101/483 |
| 2017/0217226 | A1 | 8/2017 | Biggot et al. | |

FOREIGN PATENT DOCUMENTS

| | | | |
|---|---|---|---|
| EP | 1209000 | B1 | 4/2004 |
| JP | 2019-210140 | A | 12/2019 |

OTHER PUBLICATIONS

Europäisches Patentamt [European Patent Office], Europäischer Recherchenbericht [European Search Report], Oct. 26, 2023 [Oct. 26, 2023], 5 Pages, Munchen, Germany (DE).

* cited by examiner

FOLDING APPARATUS OF AN OFFSET WEB-FED PRINTING PRESS AND OFFSET WEB-FED PRINTING PRESS

CROSS-REFERENCE TO RELATED APPLICATION

This United States non-provisional utility patent application claims the benefit of priority to German Patent Application No. DE 10 2022 111 571.2 filed on May 10, 2022, the entire disclosure of which is incorporated herein by reference.

FIELD OF THE INVENTION

The present invention relates to a folding apparatus of an offset web-fed printing press. The present invention furthermore relates to an offset web-fed printing press.

BACKGROUND OF THE INVENTION AND RELATED ART

Offset printing units of an offset web-fed printing press serve the purpose of printing a web-shaped printing material with a fixed printing format. The cylinders of an offset printing unit of an offset web-fed printing press are thus designed for a fixed printing format. If a printing material with a different printing format is to be printed on an offset web-fed printing press, then different offset printing units with different printing formats have to be kept ready for this purpose. When executing a print job with a defined printing format, only those offset printing units, which have the same printing format, are used for printing. After completion of a print job with a defined printing format, the offset printing units used for printing can then be changed to execute a new print job with a new printing format.

To form printing products, an offset web-fed printing press has a folding apparatus. The general setup of a folding apparatus of an offset web-fed printing press is known from practice. A folding apparatus of an offset web-fed printing press thus has at least one cutting means for separating individual signatures from a printed, web-shaped printing material. Prior to separating the signatures, a longitudinal fold can be formed on the printing material, which is still web-shaped, in the region of a former. Alternatively, and additionally, a transverse fold can be made on separated signatures in the region of a transverse folding means and/or a longitudinal fold in the region of a longitudinal folding means.

According to practice, the folding apparatus of an offset web-fed printing press is adapted to the format of the offset printing units. If an offset web-fed printing press has offset printing units with different printing formats, the offset web-fed printing press then thus also has several folding apparatuses in order to further process the printing formats printed by means of the different offset printing units into printed products in the region of a respective folding apparatus.

Digital web-fed printing presses need to be differentiated from offset web-fed printing presses. In digital web-fed printing presses, printing is not performed with fixed printing plates and therefore with fixed printing formats, but, on the contrary, without printing plates with variable printing formats. Folding apparatuses of digital web-fed printing presses are known from the prior art, which, to a certain extent, provide a format variability at a digital web-fed printing press.

DE 10 2012 103 729 A1 discloses a folding apparatus of a digital web-fed printing press comprising a cutting means, via which signatures can be separated from a printed printing material. A longitudinal folding means is arranged upstream of the cutting means. Signatures separated from the web-shaped printing material in the region of the cutting means are accelerated with the help of an accelerating means to the circumferential speed of a collecting cylinder. Transverse folds can be made on the separated signatures in the region of a folding jaw cylinder, and longitudinal folds can be made on the separated signatures in the region of a further longitudinal folding means. Signatures can be separated from the printed printing material in a format-variable manner, that is, with different cut-off lengths, in the region of the cutting means.

EP 1 209 000 B1 discloses a method for producing newspapers on a digital printing press comprising two folding stations and two collecting stations.

There is a need for a format-variable folding apparatus of an offset web-fed printing press.

OBJECT AND SUMMARY OF THE INVENTION

Accordingly, the present invention is based on the object of creating a format-variable folding apparatus of an offset web-fed printing press. The present invention is further based on the object of creating an offset web-fed printing press comprising such a folding apparatus.

The object is solved by means of a folding apparatus of an offset web-fed printing press according to the present invention.

The folding apparatus according to the present invention of an offset web-fed printing press has a first transport means, which is formed as belt conveyor system for a web-shaped printing material. The first transport means is configured in such a way that belts thereof can be driven at a speed, which corresponds to the speed of the web-shaped printing material.

The folding apparatus according to the present invention of an offset web-fed printing press further has a first cutting means arranged in the region of the first transport means. The first cutting means is configured in such a way that it severs the web-shaped printing material in a format-variable manner in those sections, which are not covered by the belts of the first transport means.

The folding apparatus according to the present invention of an offset web-fed printing press further has a second transport means, which is arranged downstream from the first transport means and is formed as belt conveyor system, the belts of which are offset relative to the belts of the first transport means transversely to the transport direction of the printing material, wherein the second transport means is configured in such a way that belts thereof can be driven at a speed, which is larger than the speed of the belts of the first transport means.

The folding apparatus according to the present invention of an offset web-fed printing press further has a second cutting means arranged in the region of the second transport means, wherein the second cutting means is configured in such a way that, in order to separate signatures, it severs the web-shaped printing material in a format-variable manner in those sections, which are covered by the belts of the first transport means.

The folding apparatus according to the present invention of an offset web-fed printing press further has a signature accelerator for accelerating the signatures separated from the web-shaped printing material, starting at the speed of the belts of the first transport means, to the speed of the belts of the second transport means.

The folding apparatus according to the present invention of an offset web-fed printing press has the first transport means and the second transport means, which are each formed as belt conveyor systems. The belts of the second belt conveyor system are offset relative to the belts of the first belt conveyor system, viewed transversely to the transport direction of the web-shaped printing material.

The first cutting means is arranged in the region of the first transport means, and the second cutting means is arranged in the region of the second transport means. Together, the two cutting means sever the printing material in a format-variable manner over the entire width thereof transversely to the transport direction, namely the first cutting means in those regions, which are not covered by the belts of the first transport means, and the second cutting means in those regions, which are not covered by the belts of the second transport means, but which are covered by the belts of the first transport means.

The belts of the second transport means have a higher speed than the belts of the first transport means. In the region of the first transport means, the speed of the belts corresponds to the speed of the web-shaped printing material. In the region of the second transport means, the signal accelerator accelerates signatures separated from the web-shaped printing material to the speed of the belts of the second transport means. The speed of the web-shaped printing material upstream of the second cutting means is lower than the speed of the belts of the second transport means.

The folding apparatus according to the present invention of an offset web-fed printing press allows for a reliable, format-variable separation of signatures from the web-shaped printing material in the region of the first and second cutting means, a reliable guidance of the printing material and of the signatures in the region of the first and second transport means, as well as an acceleration of the signatures from the speed of the first transport means to the speed of the second transport means.

The folding apparatus according to the present invention is used on an offset web-fed printing press, which has at least two offset printing units, which differ with regard to their printing format. The folding apparatus according to the present invention makes several folding apparatuses superfluous, which are designed for different printing formats on offset printing units.

To provide the format variability, the first transport means is preferably configured in such a way that, with the same number of signatures, which are to be processed, the speed of the belts of the first transport means, per time unit, is lower, the smaller or shorter the length of the signatures.

To provide the format variability, the signature accelerator is preferably configured in such a way that the more strongly it accelerates the signatures from the speed of the belts of the first transport means to the speed of the belts of the second transport means, the shorter the length of the signatures. To provide the format variability, a relative position of the signature accelerator to the second cutting means can further be adjusted in a format-variable manner in such a way that the shorter the length of the signatures, the smaller a distance of the signature accelerator from the second cutting means in the transport direction of the signatures.

The format variability can be provided in a particularly advantageous manner by means of the above features. The speed of the belts of the first transport means as well as the acceleration of the signatures by means of the signal accelerator, and the distance of the signal accelerator from the second cutting means can be adapted in a format-variable manner.

The first cutting means and the second cutting means are preferably formed as cutting cylinders and can be driven in such a way that when performing the respective format-variable cut, a circumferential speed of the respective cutting cylinder corresponds to the speed of the web-shaped printing material, namely independently of the length of the signatures. The format variability can also be ensured particularly advantageously with this.

The object is further solved by means of an offset web-fed printing press according to the present invention.

Preferred further developments of the present invention follow from the following description of exemplary embodiments. Without being limited thereto, the exemplary embodiments of the present invention will be described in more detail on the basis of the accompanying drawing figures.

BRIEF DESCRIPTION OF THE DRAWING FIGURES

DETAILED DESCRIPTION OF EXEMPLARY EMBODIMENTS

The present invention relates to a folding apparatus of an offset web-fed printing press.

Figure 1:
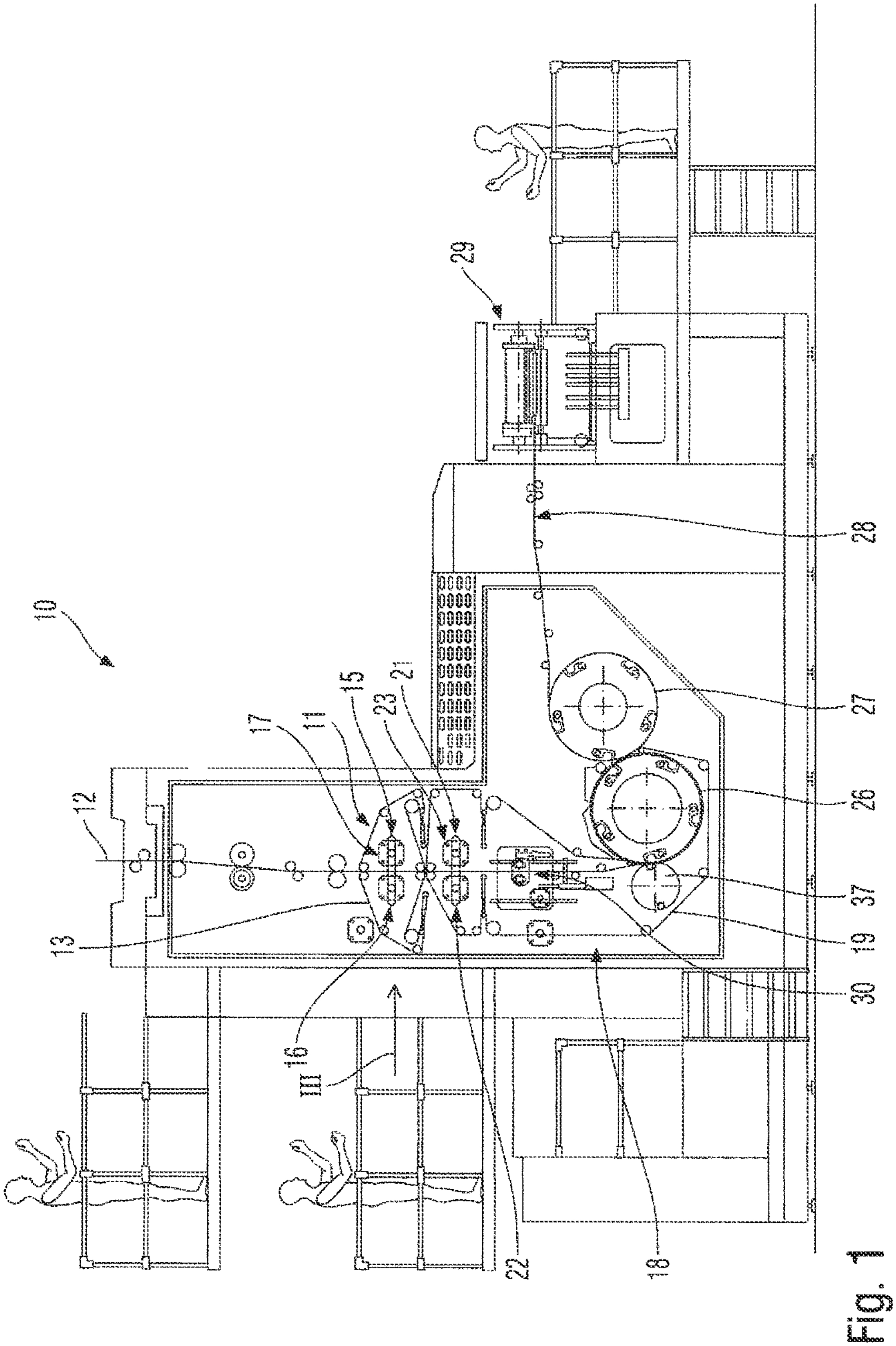
FIG. 1 shows a side view of an exemplary embodiment of a folding apparatus of an offset web-fed printing press according to the present invention.
Figure 2:
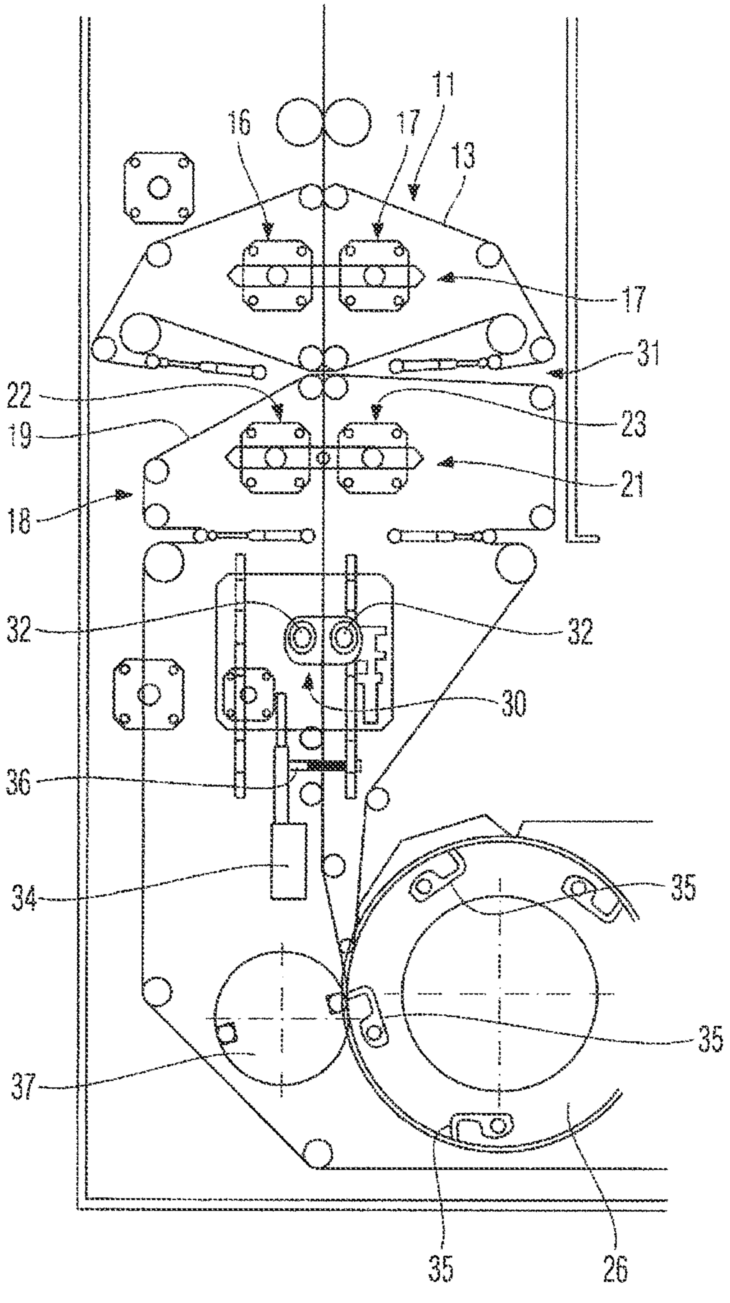
FIG. 2 shows a section from the folding apparatus of FIG. 1.
Figure 3:
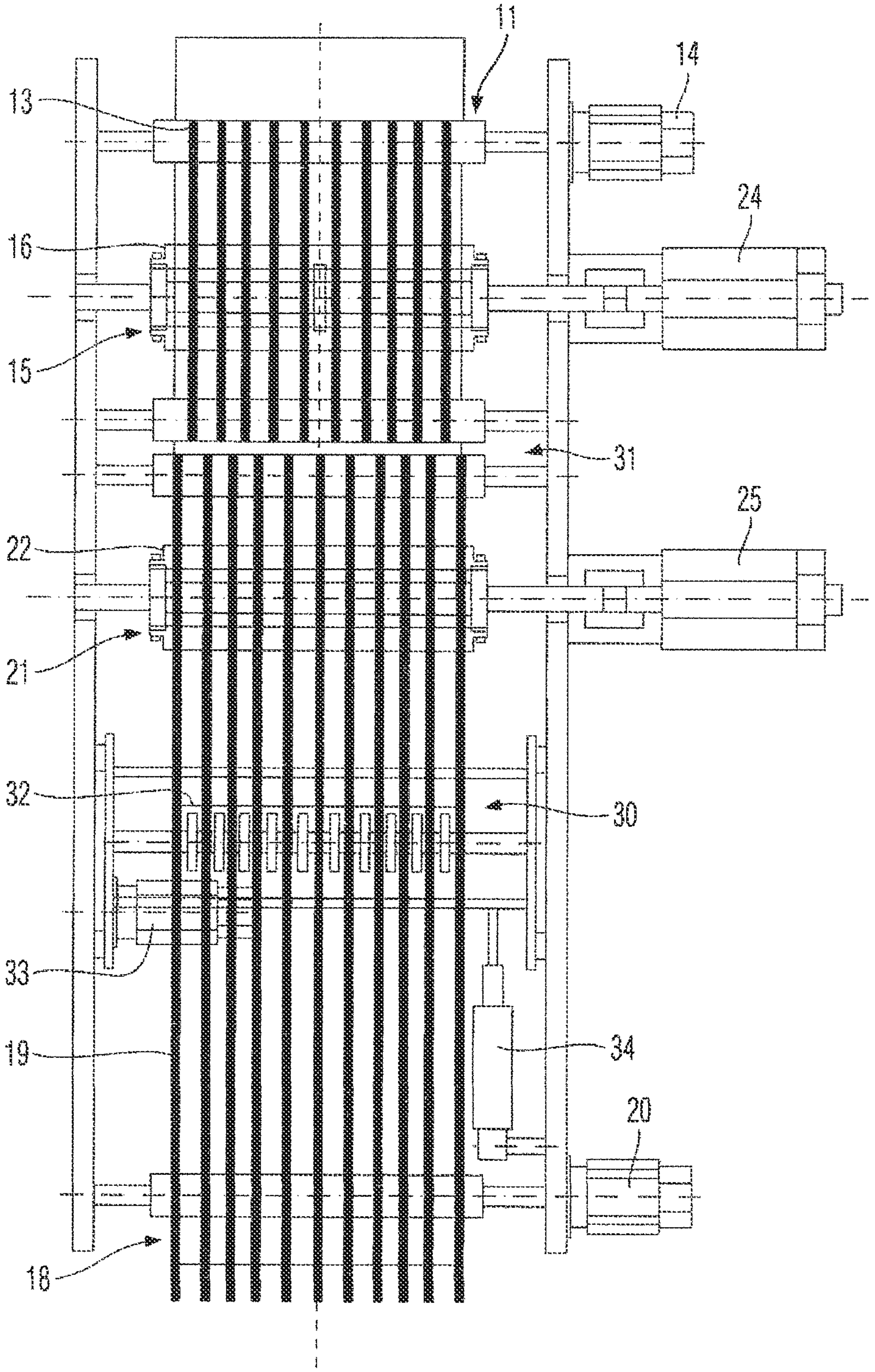
FIG. 3 shows a section from the folding apparatus of FIG. 1 in the viewing direction III indicated in FIG. 1.

FIGS. 1-3 show an exemplary embodiment of a folding apparatus 10, which is formed as book folding apparatus of an offset web-fed printing press. As will be described further below, signatures are separated from a printed printing material web in the region of a book folding apparatus, are collected to form signature stacks, and longitudinal folds are formed on the signature stacks. Even though the present invention can be used particularly advantageously in the case of a folding apparatus, which is formed as book folding apparatus, the present invention is not limited to this application.

The folding apparatus 10 of FIG. 1, which is formed as book folding apparatus, has a first transport means 11, which is formed as first belt conveyor system.

The first transport means 11, which is formed as first belt conveyor system, serves the purpose of conveying a web-shaped, printed printing material 12 in the region of the folding apparatus 10, wherein the first transport means 11 is configured in such a way that belts 13 of the first transport means 11 can be driven at a speed, which corresponds to the speed of the web-shaped printing material.

For this purpose, the first transport means 11 has a drive motor 14, which drives the belts 13 of the first transport means 11 in such a way that the speed thereof corresponds to the speed of the web-shaped printing material 12.

The folding apparatus 10 has a first cutting means 15, which is arranged in the region of the first transport means 11, which is formed as first belt conveyor system. The first cutting means 15 is configured in such a way that it severs the web-shaped printing material 12 in a format-variable manner in those regions, which are not covered by the belts 13 of the first transport means 11.

In the shown exemplary embodiment, the first cutting means 15 has a cutting cylinder 16 comprising cutting blades, which interacts with a counter cylinder 17. The cutting blades of the cutting cylinder 16 are interrupted at the positions, at which the belts 13 of the first transport means 11 cover the web-shaped printing material.

Downstream from the first transport means 11, the folding apparatus 10 has a second transport means 18, which is formed as second belt conveyor system. Belts 19 of the second transport means 18 are offset relative to the belts 13 of the first transport means 11, viewed transversely to the transport direction of the first and second transport means 11, 18, so that the belts 19 of the second transport means 18 release those sections of the printing material 12, which are covered by the belts 13 of the first transport means 11 in the region of the first transport means 11. The belts 19 of the second transport means 18 can be driven by a drive motor 20 in such a way that they are driven at a speed, which is larger than the speed of the belts 13 of the first transport means 11.

A second cutting means 21 is arranged in the region of the second transport means 18. The second cutting means 21 is configured such that it, for separating signatures from the web-shaped printing material 12, severs the latter in a format-variable manner in those regions, which are covered by the belts 13 of the first transport means 11 in the region of the first transport means 11 and thus of the first cutting means 15.

The second cutting means 21 severs the web-shaped printing material 12 in those regions, at which a severing of the web-shaped printing material 12 thus does not take place in the region of the first cutting means 15.

The format-variable partial section of the first cutting means 15 is therefore completed in the region of the second cutting means 21, in order to sever signatures from the web-shaped printing material in a format-variable manner.

The first cutting means 15 and the second cutting means 21 are synchronized in such a way that the cuts thereof, which are made in a format-variable manner, are aligned viewed transversely to the transport direction of the printing material 12, thus result in a continuous cut over the width of the printing material.

In the shown exemplary embodiment, the second cutting means 21 is also formed by a cutting cylinder 22 and a counter cylinder 23, which cooperates with the cutting cylinder 22. The cutting cylinder 22 of the second cutting means 21 carries cutting blades, which are interrupted in the region of the belts 19 of the second transport means 18.

In FIG. 3, the counter cylinders 17, 23 are arranged behind the cutting cylinders 16, 22, thus covered by them.

FIG. 3 shows drive motors 24, 25 for the two cutting cylinders 16, 22 of the two cutting means 15, 21, in order to drive the cutting cylinders 15, 22. Drive motors of this type are also assigned to the counter cylinders 17, 23 of the cutting means 15, 21, in order to drive them. The drive motors serve the purpose of dynamically driving the cylinders 15, 22, 17, 23, in order to create the format-variable section lengths.

As already specified, the speed of the belts 13 of the first transport means 11 corresponds to the speed of the web-shaped printing material. The speed of the belts 19 of the second transport means 18 is larger than the speed of the belts 13 of the first transport means 11, wherein, in the shown exemplary embodiment, the speed of the belts 19 of the second transport means 18 corresponds to the circumferential speed of a signature collecting cylinder 26, which is arranged in the region of the second transport means 18.

In the region of the signature collecting cylinders 26, signatures separated from the web-shaped printing material 12 can be collected in a format-variable manner by forming signature stacks. These signature stacks are transferred at a signature cylinder 27 downstream from the signature collecting cylinder 26 and, starting at this signature cylinder 27, are conveyed via a transport means 28 in the direction of a longitudinal folding means 29, in order to form longitudinal folds on the signature stacks.

In order to accelerate signatures separated from the web-shaped printing material 12 to the speed of the belts 19 of the second transport means 18, the folding apparatus 10 furthermore comprises a signature accelerator 30. The signature accelerator 30 is installed in the region of the second transport means 18, namely directly adjacent to the second cutting means 21, in the region of which the signatures are separated from the web-shaped printing material 12. Upstream of the second cutting means 21, the signatures are not yet completely separated from the web-shaped printing material 12.

The second cutting means 21, which is synchronized to the first cutting means 15 and which serves the purpose of completing the separation of the signatures from the web-shaped printing material 12, is arranged directly adjacent to a transfer region 31 between the first transport means 11 and the second transport means 18 in the region of the second transport means 18.

In this transfer region 31 between the first transport means 11 and the second transport means 18, there is a differential speed between the speed of the printing material web 12 and the speed of the belts 19 of the second transport means 12.

The signature accelerator 30 accelerates the signatures, which are completely separated from the web-shaped printing material 12 in the region of the second cutting means 21, to the speed of the belts 19 of the second transport means 18.

The signature accelerator 30 is thereby formed from a pair of accelerating rollers 32, only one of which is visible in FIG. 3. FIG. 3 shows a drive motor 33 for the accelerating rollers 32.

To provide the format variability in an advantageous manner, the first transport means 11 is configured in such a way that with the same number of signatures, which are to be processed, the speed of the belts 13 of the first transport means 11, per time unit, is lower, the shorter or smaller the length of the signatures, which are to be separated from the web-shaped printing material 12 in the region of the cutting means 15, 21.

To provide the format variability in an advantageous manner, the signature accelerator 30 is configured in such a way that the more strongly it accelerates signatures from the speed of the belts 13 of the first transport means 11 to the speed of the belts 19 of the second transport means 18, the shorter the length of the signatures.

To provide the format variability in an advantageous manner, the relative position of the signature accelerator 30 to the second cutting means 21 can further be adapted in a format-variable manner.

The distance of the signature accelerator 30 from the second cutting means 21 is thus smaller, the shorter the length of the separated signatures. The relative distance of the signature accelerator 30 from the second cutting means 21 can be adjusted via a linear drive 34. The linear drive 34 can displace the signature accelerator 30, namely the accelerating rollers 32 thereof, in the direction of the transport direction of the signatures, in order to adapt the distance of the signature accelerator 30 from the second cutting means 21 in a format-variable manner in this direction.

As already specified, signatures, which are separated from the web-shaped printing material 12 and which are accelerated with the help of the signature accelerator 30 to the circumferential speed of the signature collecting cylinder 26 in the region of the second cutting means 21, can be collected to form signature stacks in the region of the signature collecting cylinder 26, wherein the signature collecting cylinder 26 is formed as puncture needle collecting cylinder in the exemplary embodiment of FIG. 1.

In FIG. 1, the signature collecting cylinder 26 thus has several puncture needles 35 distributed over its circumference, wherein several signatures can be collected to form a signature stack in the region of each of these puncture needles 35. The distance of the puncture needles 35 in the circumferential direction is designed for the largest format of the signatures, thus for the longest signatures. The distance of the puncture needles 35 in the circumferential direction corresponds to at least the section length of the longest signatures.

The circumferential speed of the signature collecting cylinder 26 relative to the speed of the printing material web 12 is larger, the shorter the length of the signatures, which are separated in a format-variable manner.

In FIG. 1 and FIG. 2, a cylinder 37, which pushes the signatures onto the puncture needles 35 for threading purposes, cooperates with the signature collecting cylinder 26, which is formed as puncture needle collecting cylinder. The cylinder 37 therefore provides a threading aid for the signatures at the puncture needles 35 of the signature collecting cylinder 26. This cylinder 37 preferably has bars made of plastic, which tension the signatures when collecting the signatures on the signature collecting cylinder 26, so that the puncture needles 35 can securely thread said signatures.

In contrast to the shown exemplary embodiment, it is also possible that the signature collecting cylinder 26 is embodied as gripper collecting cylinder. In this case, the cylinder 37, which serves as threading aid, can then be forgone.

A sensor 36 is furthermore shown in FIG. 1 and FIG. 2, with the help of which the front edge of a signature separated from the web-shaped printing material 12 can be detected. In conjunction with the signature accelerator 30, it can be ensured via this sensor 36 that a front edge of each signature reaches the signature collecting cylinder 26 in the correct relative position to its collecting means, in FIG. 1 to its puncture needles 35, so that clean signature stacks can be formed in a format-variable manner.

As already specified, the folding apparatus 10 is formed as book folding apparatus in the shown exemplary embodiment, in the case of which only a longitudinal fold is formed on the separated signatures in the region of the longitudinal folding means 29. It is possible that a further longitudinal folding means is arranged upstream of the first transport means 11 as well as of the first cutting means 15, in order to form a longitudinal fold on the printing material, which has not been severed yet. It is likewise possible that the signature collecting cylinder 26 does not only serve the purpose of collecting signatures, but also the purpose of forming transverse folds on them.

As already specified above, the cutting cylinders 16, 22 of the cutting means 15, 21 as well as the counter cylinders 17, 23 can be driven by drives 24, 25. This takes place with the help of the drive motors 24, 25 in such a way that when performing the respective cut, a circumferential speed of the respective cutting cylinder 16, 22 or a circumferential speed of the cutting blades of the respective cutting cylinder 16, 22, respectively, corresponds to the speed of the web-shaped printing material in the region of the respective cutting means 15, 21. The respective cuts can thus be performed in a particularly advantageous manner.

As already specified, the two cutting means 15, 21 are synchronized, namely, in such a way that the cuts performed by them in a format-variable manner are aligned transversely to the transport direction of the printing material 12, thus supplement one another, so that the cuts completely separate signatures from the web-shaped printing material 12 in the region of the two cutting means 15, 21. The drive motors 24, 25 of the cutting cylinders 16, 22 and the counter cylinder are highly dynamic motors, in order to accelerate and to slow down the cylinders of the cutting means 15, 21 according to the desired format of the signatures. The control of the drive motors of the cutting cylinders and of the counter cylinders of the cutting means 15, 21 preferably takes place via an electronic cam control, which is stored in a control device not shown.

The adaptation of the folding apparatus 10 to a new format takes place between two different print jobs with different format. The format is fixed or unchanged, respectively, or constant during a print job.

Figure 4:
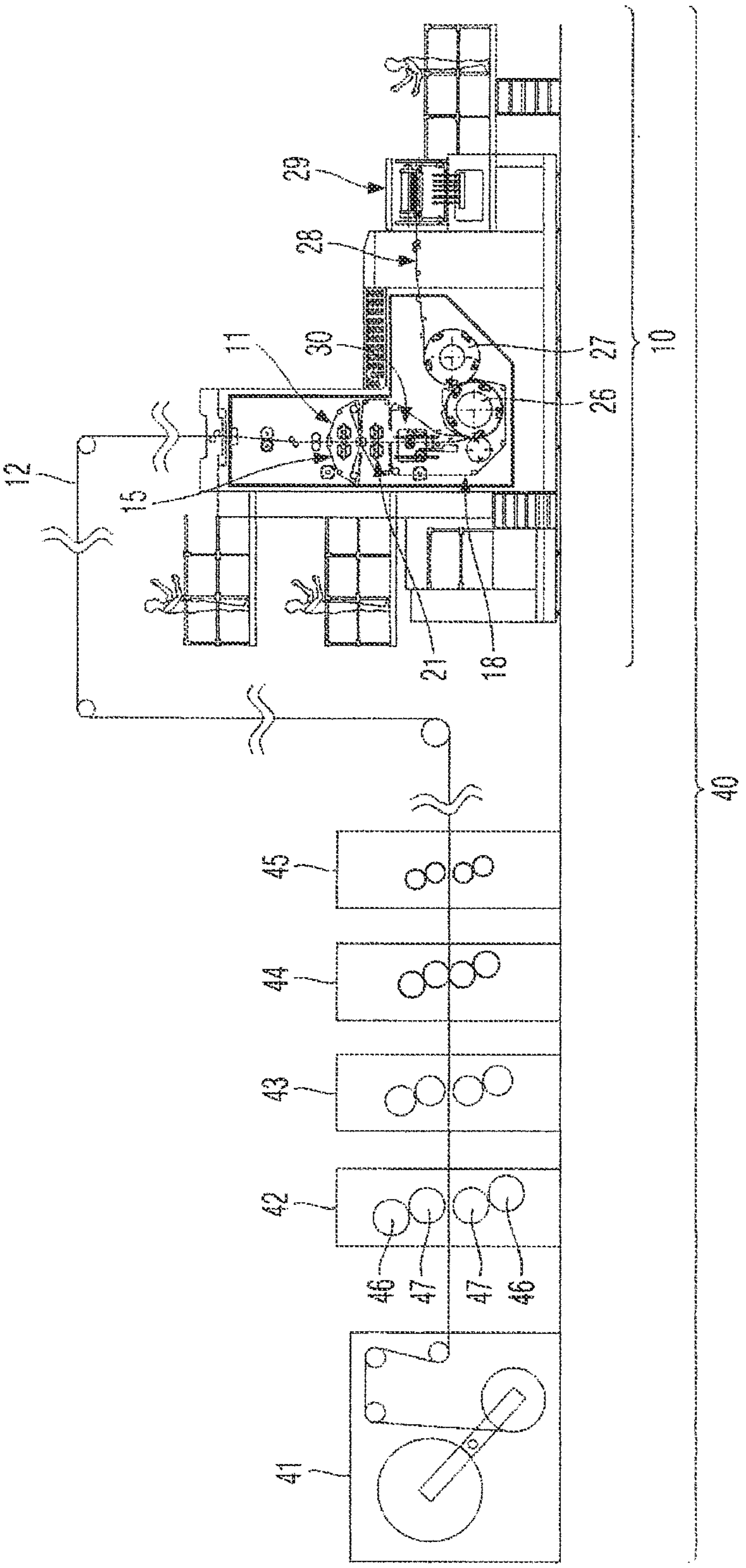
FIG. 4 shows a side view of an exemplary embodiment of an offset web-fed printing press according to the present invention.

FIG. 4 shows a schematic side view of an offset web-fed printing press 40 according to the present invention, which has the folding apparatus 10 according to the present invention of FIG. 1. The printing material web 12, from which signatures are separated in the region of the folding apparatus 10, is kept ready on a roll changer 41 and is printed in at least one offset printing unit 42, 43, 44, 45.

The offset web-fed printing press 40 of the exemplary embodiment of FIG. 4 has four offset printing units 42, 43, 44, and 45, wherein these printing units 42 to 45 in each case differ in their printing format. In the region of each of the printing units 42 to 45, the offset web-fed printing press 40 has cylinders, namely plate cylinders 46 carrying printing plates and transfer cylinders 47 carrying transfer plates, which differ with regard to their diameters and thus with regard to its offset printing format. To print a printing material web 12 during a print job, only offset printing units with the same or identical, respectively, printing unit-fixed printing format are active and thus in a printing-on position. In FIG. 4, the offset printing unit 44 is thus active and in its printing-on position, while the printing units 42, 43, and 45, which differ with regard to their printing format from the printing format of the printing unit 44, are inactive and therefore in a printing-off position.

At least one offset printing unit with a printing format corresponding to the printing format of the print job is always in its printing-on position during the printing of a print job, while other offset printing units with a different printing format, in contrast, assume their printing-off position. If a new print job with a different printing format is to be processed after completion of a print job with a defined printing format, at least one other offset printing unit of the offset printing press 40 is then used for printing, and is transferred into its printing-on position, whereas the other offset printing units with a different printing format assume their printing-off position.

As specified above, the folding apparatus 10 of the offset web-fed printing press 40 can be adapted to the printing format, which is to be printed between two print jobs, in that in particular the relative position of the signature accelerator 30 is adapted to the second cutting means 21. The other format-variable features of the folding apparatus 10 have already been discussed in detail above.

The folding apparatus 10 is thereby designed for the largest printing format in the region of the offset printing units. As described above, the changeover to smaller formats takes place by means of the format-variable severing of the printing material web 12 in the region of the cutting means 15, 21 as well as by means of the format-variable transport of the separated signatures in particular via the signature accelerator 30.

If an offset web-fed printing press 40 thus has offset printing units 42, 43, 44, 45 with different printing formats, the printing formats, which can be printed with the help of the offset printing units 42, 43, 44, 45, can thus be further processed with one and the same folding apparatus 10, without the necessity of several folding apparatuses.

That which is claimed is:

1. A folding apparatus of an offset web-fed printing press, comprising:

a first transport means formed as a first belt conveyor system for a web-shaped printing material, wherein the first transport means is configured such that one or more first belts thereof are driven at a speed that corresponds to a speed of the web-shaped printing material;

a first cutting means arranged in a region of the first transport means, wherein the first cutting means is configured to sever the web-shaped printing material in a format-variable manner in one or more sections of the first transport means that are not covered by the one or more first belts of the first transport means;

a second transport means arranged downstream from the first transport means and formed as a second belt conveyor system, wherein the second transport means is configured such that one or more second belts thereof are offset relative to the one or more first belts of the first transport means transversely to a transport direction of the web-shaped printing material, wherein the second transport means is configured such that the one or more second belts thereof are driven at a speed that is larger than the speed of the one or more first belts of the first transport means;

a second cutting means arranged in a region of the second transport means, wherein the second cutting means is configured such that to separate a plurality of signatures from the web-shaped printing material the second cutting means severs the web-shaped printing material in a format-variable manner in the one or more sections of the first transport means that are covered by the one or more first belts of the first transport means; and a signature accelerator for accelerating the plurality of signatures starting at the speed of the one or more first belts of the first transport means to the speed of the one or more second belts of the second transport means.

2. The folding apparatus according to claim 1, further comprising a longitudinal folding means for forming a longitudinal fold on the plurality of signatures.

3. The folding apparatus according to claim 1, further comprising a signature collecting cylinder arranged in a downstream direction from the second transport means, wherein the one or more second belts of the second transport means are driven in a format-variable manner at a speed that corresponds to a circumferential speed of the signature collecting cylinder.

4. The folding apparatus according to claim 3, wherein the signature collecting cylinder is configured in a format-variable manner so that the circumferential speed thereof is larger for a shorter length of the plurality of signatures.

5. The folding apparatus according to claim 3, wherein the signature collecting cylinder is formed as a gripper-collecting cylinder.

6. The folding apparatus according to claim 3, wherein the signature collecting cylinder is formed as a puncture needle collecting cylinder, and wherein a cylinder configured to tension the plurality of signatures for threading to puncture a plurality of needles of the puncture needle collecting cylinder cooperates with the puncture needle collecting cylinder.

7. The folding apparatus according to claim 1, wherein the first transport means is configured in a format-variable manner so that for a number of the plurality of signatures the speed of the one or more first belts of the first transport means is lower per unit time for a shorter length of the plurality of signatures.

8. The folding apparatus according to claim 1, wherein the signature accelerator is configured in a format-variable manner such that the faster the signature accelerator accelerates the plurality of signatures from the speed of the one or more first belts of the first transport means to the speed of the one or more second belts of the second transport means the shorter a length of the plurality of signatures.

9. The folding apparatus according to claim 1, wherein a relative position of the signature accelerator is format-variable to the second cutting means.

10. The folding apparatus according to claim 9, wherein a distance of the signature accelerator from the second cutting means in a transport direction of the plurality of signatures is smaller for a shorter length of the plurality of signatures.

11. The folding apparatus according to claim 10, wherein the distance of the signature accelerator from the second cutting means in the transport direction of the plurality of signatures is adjusted via a linear drive.

12. The folding apparatus according to claim 1, wherein the first cutting means and the second cutting means are synchronized so that cuts made thereby are aligned when viewed transversely to the transport direction of the web-shaped printing material.

13. The folding apparatus according to claim 1, wherein the first cutting means and the second cutting means each have cutting cylinders that are driven such that when performing a respective cut a circumferential speed of the respective cutting cylinder corresponds to the speed of the web-shaped printing material.

14. An offset web-fed printing press, comprising:

a roll changer configured to keep a web-shaped printing material ready to be printed;

at least two offset printing units that differ with regard to their printing format and are configured to print the web-shaped printing material ready to be printed with a printing unit-fixed printing format depending on a printing format specified by a print job, wherein, to print the web-shaped printing material, at least one offset printing unit with the printing format specified by the print job assumes a printing-on position while each other offset printing unit with a printing format that differs from the printing format specified by the print job assumes a printing-off position; and a folding apparatus according to claim 7, which, depending on the printing format specified by the print job, is configured to separate a plurality of signatures from the web-shaped printing material and to fold the plurality of signatures separated from the web-shaped printing material.

15. The offset web-fed printing press according to claim 14, wherein the folding apparatus is a book folding apparatus.

* * * * *